United States Statutory Invention Registration [19]

[11] Reg. Number: H536

Strickland et al. [43] Published: Oct. 4, 1988

[54] METHOD OF DETECTING AND LOCATING AN ELECTROSTATIC DISCHARGE EVENT

[75] Inventors: Brian R. Strickland; George R. Edlin; Calvin C. Easterbrook; Thomas G. Roberts, all of Huntsville, Ala.

[73] Assignee: The United States of America as represented by the Secretary of the Army, Washington, D.C.

[21] Appl. No.: 886,995

[22] Filed: Jul. 18, 1986

[51] Int. Cl.[4] ..... G01N 27/60

[52] U.S. Cl. ..... 324/456; 324/536; 324/520

[58] Field of Search ..... 324/535, 536, 547, 555, 324/452, 454, 455–458; 73/587

[56] References Cited

U.S. PATENT DOCUMENTS

| | | | |
|---|---|---|---|
| 3,173,086 | 3/1965 | Kresge | 324/536 X |
| 3,505,597 | 4/1970 | Cronin et al. | 324/536 X |
| 3,622,872 | 11/1971 | Boaz | 324/536 |
| 4,238,733 | 12/1980 | Freeman | 324/536 X |
| 4,565,964 | 1/1986 | Matthews et al. | 324/536 X |

*Primary Examiner*—Stephen C. Buczinski
*Assistant Examiner*—Linda J. Wallace
*Attorney, Agent, or Firm*—John C. Garvin; Freddie M. Bush; James T. Deaton

[57] ABSTRACT

A method of locating an electrostatic discharge event in a predetermined structure by sensing electromagnetically that an electrostatic discharge event has occurred and producing a trigger signal from the electromagnetic sensing to control a recording device for the starting of time, utilizing a plurality of acoustic detectors about the structure for sensing the acoustic of the electrostatic discharge event, determining the time elapsed between the starting of time by the electromagnetic sensing and the signals sensed by the acoustic detectors and utilizing the information gained from the times sensed and the predetermined locations of the sensors to determine the location of the electrostatic discharge event in the predetermined structure.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF DETECTING AND LOCATING AN ELECTROSTATIC DISCHARGE EVENT

DEDICATORY CLAUSE

The invention described herein may be manufactured, used, and licensed by or for the Government for governmental purposes without the payment to us of any royalties thereon.

BACKGROUND OF THE INVENTION

In the past, it has not been possible to accurately locate electrostatic discharges even though it is important to accurately locate the site of electrostatic discharges that occur in systems or materials that are sensitive to electrostatic discharges. Sensitive electrostatic discharges that need to be identified involve systems that include missile systems that can be damaged by electrostatic discharges and propellants that can be inadvertently detonated by an electrostatic discharge event. These events are electrostatic arcs that are caused by charge separations. The charges may become separated by friction, propellant separation, or by induction fields in voids. These events generally occur subsurface and are not detectable optically. The fact that an event has occurred can be detected electrically, but to locate it electrically requires a very dense grid of sensors which is cost prohibitive, difficult to use and perturb the charge distribution to be monitored. Thus, it can be readily appreciated that a need exists for a relatively inexpensive, easy to use, and accurate way to detect and locate electrostatic discharge events.

Therefore, it is an object of this invention to supply a method by which an electrostatic discharge event can be detected and located.

Another object of this invention is to utilize an electromagnetic method for detecting the event and an acoustic method for producing information from which the site of the electrostatic discharge can be located.

Still another object of this invention is to provide a method that utilizes means that are readily available, relatively simple, relatively inexpensive and have the ability to provide sufficient information to accurately locate an electrostatic discharge event.

Other objects and advantages of this invention will be obvious to those skilled in this art.

SUMMARY OF THE INVENTION

In accordance with this invention, a method of detecting and locating an electrostatic discharge event is provided in which an electromagnetic detector on the structure of the device that has the electrostatic discharge event occuring there at is utilized for detecting that the event has occurred to start the counting of time, three acoustic detectors placed at different positions on the device in which the electrostatic discharge event occurs are utilized for detecting when the acoustic from the electrostatic discharge event reaches each of the acoustic detectors, and determining the time it takes the acoustics to travel to each of the acoustic detectors with the known positions of the acoustic detectors and utilizing this information to determine the location of the electrostatic discharge event within the device.

DETAILED DESCRIPTION OF THE INVENTION

Figure 1:
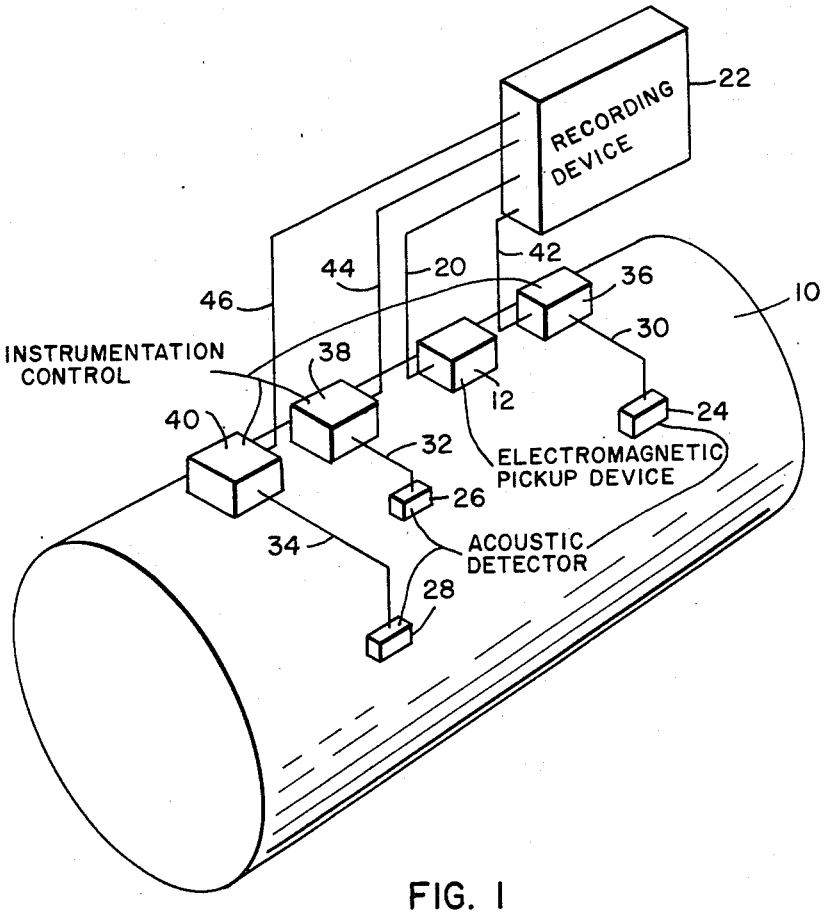
FIG. 1 is a schematic illustration of an electrostatic discharge detector and locator system for carrying out the method.
Figure 2:
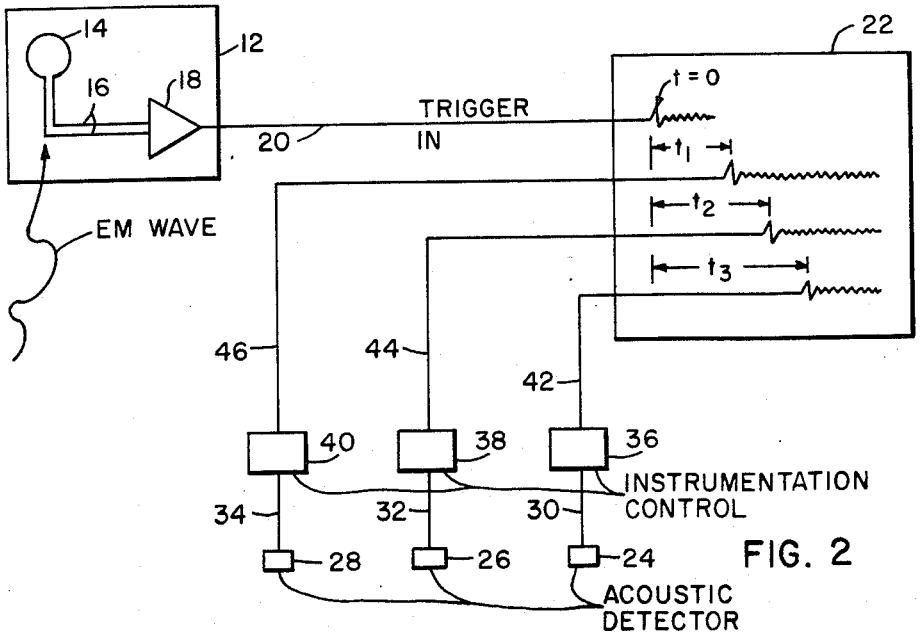
FIG. 2 is a schematic circuit diagram for the system used in the method and illustrating the records caused to be produced by the detectors.

Referring now to the drawings, the event desired to be detected is located in a device such as structure 10 that contains materials that are sensitive to electrostatic discharge. Structures of this type are propellants as well as other types of missile systems. An electromagnetic pickup device 12 is secured in a conventional manner to structure 10 and has an antenna 14 (see FIG. 2) such as a loop or stub antenna for picking up the electromagnetic waves of the event. Antenna 14 is connected by leads 16 through a high frequency audio amplifier means 18 greater than 100 Khz. Amplifier 18 is connected by appropriate lead 20 to a recording device 22 such as an oscilloscope, oscillograph, or computer to provide a trigger input through lead 20 to recording device 22 to mark the starting of time at $t=0$ as indicated. Even though one electromagnetic pickup device has been illustrated, it may be desirable in some applications to provide more than one electromagnetic pickup on the structure in which the electromagnetic discharge event is to occur. Structure 10 also includes three acoustic detectors 24, 26, and 28 that are attached in a conventional manner to the structure of the system under test. These acoustic detectors 24, 26 and 28 are preferrably contact accelerometers such as high frequency microphones that have a frequency response of 2.5 KHz to 35 KHz with a rise time of $10^{-5}$ seconds or less. Detectors 24, 26 and 28 are connected by leads 30, 32 and 34 to instrumentation control containers 36, 38 and 40. Each instrumentation control container includes an accelerometer drive for its respective detector and conditioning amplifier means. The output from the conditioning amplifier means is connected by leads 42, 44, and 46 to recording device 22 for recording the acoustics detected by detectors 24, 26 and 28 to establish times $t_1$, $t_2$, and $t_3$. If desired, instrumentation control containers 36, 38 and 40 can contain fiber optic drives and fiber optic controls as are conventional in this type art for coupling the information. It is noted that detectors 24, 26, and 28 have been arbitrarily located as indicated, and the indicated locations work well. Since the location of the electrostatic discharge event relative to the acoustic detectors is to be determined, it is not desired to place the acoustic detectors close together or in a straight line. The first signal to reach each of detectors 24, 26 and 28 is the only useful signal that is used in determining the location of the electrostatic discharge event. There may be many standing waves set up in the material and the second, third, etc., wave may be detected until the signals are difficult to distinguish from background clutter. These signals may be useful in establishing the strength of the electrostatic discharge event; however, this particular feature is not of particular interest to this invention.

In operation, when an electrostatic discharge event occurs in structure 10, the event is detected at antenna 14 of electromagnetic pickup 12 and the signal triggers recording device 22 to start the time at $t=0$ as illustrated. The time required for the signal to travel from the location of the electrostatic discharge event to the location of the antenna of the electromagnetic pickup has been neglected. This time is of the order of a few nanoseconds. Some time later, after time $t=0$, say $t_1$, an acoustic signal from the electrostatic discharge event is detected by the closest detector of detectors 24, 26, and 28. If the velocity of sound is V, then the distance X from this detector to the electrostatic discharge event's location is given by $X_1=Vt_1$. Therefore, the electrostatic discharge event occurs somewhere on the surface of a sphere centered at the location of this particular detector with a radius of $X_1$. The next detector of detectors 24, 26 and 28 to receive the signal determines a time $t_2$ as illustrated and is located distance $X_2=Vt_2$. This electrostatic discharge event is therefore also located on the surface of a sphere centered at the location of the second closest detector with a radius of $X_2$. Thus, the electrostatic discharge event is located on a circle which is the innersection of these two spheres. The fartherest detector of detectors 24, 26 and 28 receives the signal at time $t_3$ and likewise determines a sphere, of radius $X_3=Vt_3$, on the surface of which the eleotrostatic discharge event also occurs. The surface of this third sphere also intersects the above circles at only one point. This common point of the three spheres locates where the electrostatic discharge event took place.

The location of the electrostatic discharge event is described mathematically below. The first detector assumes a right handed coordinate system X, Y, Z, and that $t_1<t_2<t_3$. Let the first detector be located at $(-h_1, 0, 0)$, the second detector be located at $(h_1, 0, 0)$, the third detector be located at $(0, h_2, h_3)$. Here the X axis has been chosen so that both the first detector and the second detector are located on it. Now if the event occurs at (X, Y, Z) then the three shares on which the event is located are given by

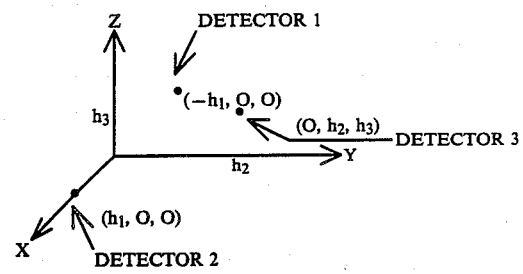

Where $X_1=Vt_1$, $X_2=Vt_2$, and $X_3=Vt_3$ and the solution of this system of equations gives the values of X, Y, and Z for the electrostatic discharge event. The above equations are quadratic, and therefore there are two possible solutions. This ambiguity can be removed by the use of an additional acoustic detector. However, for most applications the three acoustic detectors can be arranged so that one of these solutions falls outside the body being tested. In any event, in practice this data processing can be accomplished by allowing recording device 22 to be a small computer.

In some systems where several materials are used, there exist inhomogenuities and the velocity of sound may not be constant or isotropic. These anisotropic properties can be troublesome, but the systems of concern are known and a knowledge of the materials involved exist. Therefore, these uncertainties can be minimized by calibration techniques.

We claim:

1. A method of locating an electrostatic discharge event in a predetermined structure, said method comprising sensing electromagnetically that an electrostatic discharge event has occurred, producing a trigger signal from said sensed electromagnetic discharge event and utilizing said trigger signal to control a recording device and start the counting of time at $t=0$, sensing acoustics from said electrostatic discharge event at three spaced apart positions on said structure and communicating the sensed acoustics as inputs to said recording device to determine the time ellapsed from $t=0$ until the acoustics from the electrostatic discharge event reaches each of the three sensing acoustic and utilizing the information gained by the electromagnetic sensing and the acoustic sensing to determine the location of the electrostatic discharge event in said structure.

2. A method of locating an electrostatic discharge event as set forth in claim 1, wherein an antenna is used in the electromagnetic sensing of said electrostatic charge event, and wherein high frequency microphones with frequency response from 2.5 KHz to 35 KHz are used for said acoustic sensing.

3. A method of locating an electrostatic discharge event as set forth in claim 2, wherein said recording device utilized is an oscilloscope.

4. A method of locating an electrostatic discharge event as set forth in claim 3, wherein said acoustic sensing is sensed at random positions about said structure.

* * * * *